United States Patent
Park

(10) Patent No.: US 11,418,349 B2
(45) Date of Patent: Aug. 16, 2022

(54) BLOCK CHAIN-BASED NODE DEVICE, METHOD FOR OPERATING NODE DEVICE, AND DATA PROCESSING SYSTEM

(71) Applicant: Park Sung Bae, Seoul (KR)

(72) Inventor: Sung Bae Park, Seoul (KR)

( * ) Notice: Subject to any disclaimer, the term of this patent is extended or adjusted under 35 U.S.C. 154(b) by 126 days.

(21) Appl. No.: 16/969,549

(22) PCT Filed: Feb. 12, 2019

(86) PCT No.: PCT/KR2019/001689
§ 371 (c)(1),
(2) Date: Aug. 12, 2020

(87) PCT Pub. No.: WO2019/156533
PCT Pub. Date: Aug. 15, 2019

(65) Prior Publication Data
US 2021/0006408 A1    Jan. 7, 2021

(30) Foreign Application Priority Data

Feb. 12, 2018 (KR) .......... 10-2018-0017256

(51) Int. Cl.
*H04L 9/32* (2006.01)
*H04L 9/08* (2006.01)

(52) U.S. Cl.
CPC .......... *H04L 9/3236* (2013.01); *H04L 9/0825* (2013.01); *H04L 9/0894* (2013.01); *H04L 2209/34* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 2017/0011460 A1* | 1/2017 | Molinari | H04L 63/0823 |
| 2018/0032273 A1* | 2/2018 | Ateniese | H04L 9/3242 |
| 2019/0028276 A1* | 1/2019 | Pierce | G06Q 20/02 |
| 2019/0080406 A1* | 3/2019 | Molinari | G06Q 20/3672 |
| 2019/0179954 A1* | 6/2019 | Mardikar | H04L 63/0861 |
| 2019/0213821 A1* | 7/2019 | Davis | H04L 9/3247 |

* cited by examiner

*Primary Examiner* — Eleni A Shiferaw
*Assistant Examiner* — Bassam A Noaman
(74) *Attorney, Agent, or Firm* — McLean IP Global; Jason Y. Pahng

(57) ABSTRACT

The present invention relates to a block chain-based method of generating data block shared between a plurality of nodes. According to an example, the method for generating the data block may comprise a step for obtaining at least one binding data having public or private characteristics; a step for determining a binding key having a decoding permission level for each binding data; a step for encoding the binding data using the binding key; and a step for generating a data block including the encoded binding data, and at least a portion of the binding key.

19 Claims, 9 Drawing Sheets

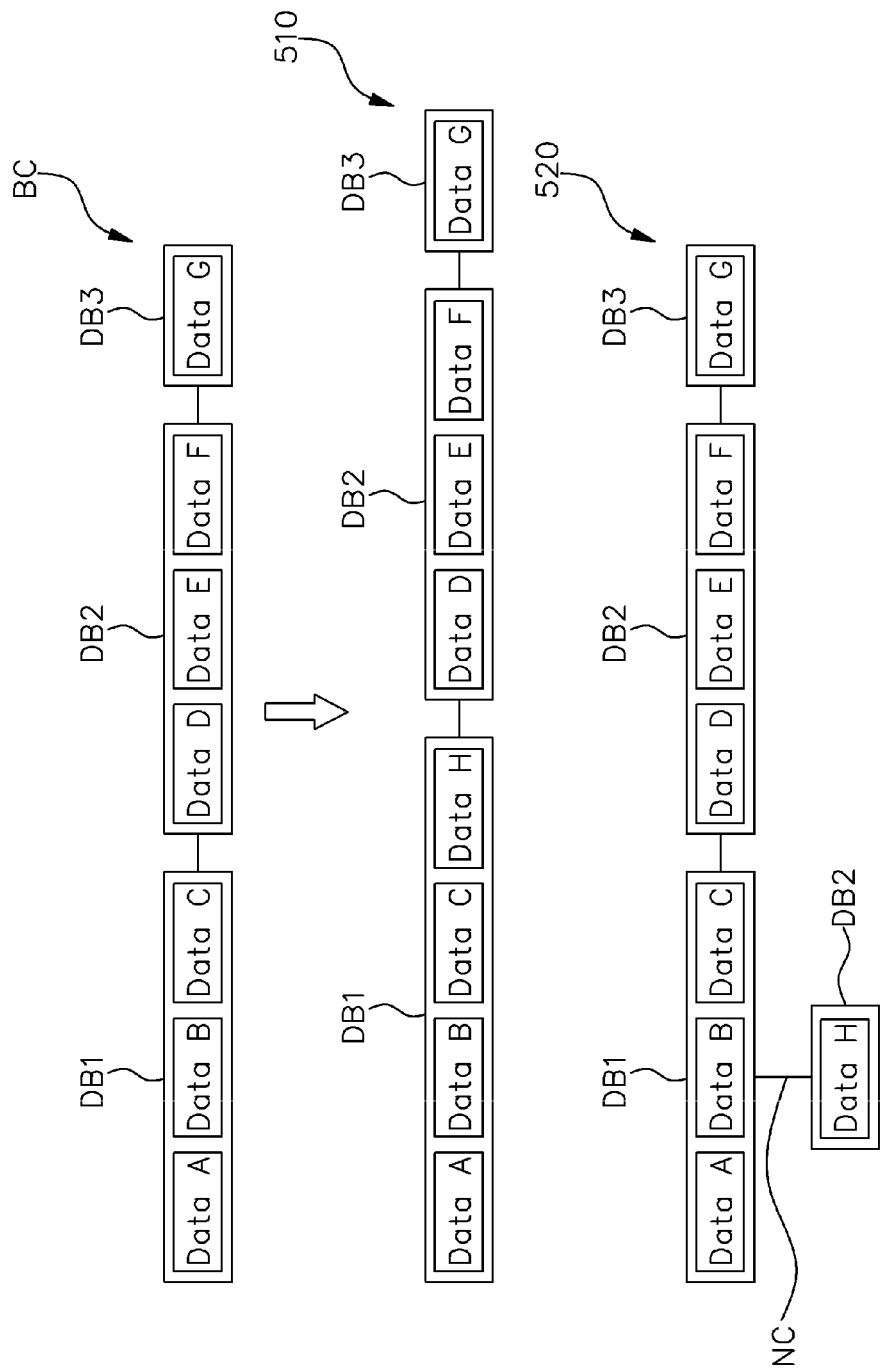

BLOCK CHAIN-BASED NODE DEVICE, METHOD FOR OPERATING NODE DEVICE, AND DATA PROCESSING SYSTEM

CROSS-REFERENCES TO RELATED APPLICATION

The present application claims the benefit of Korean application number 10-2018-0017256, filed on Feb. 12, 2018, which is herein incorporated by reference in its entirety.

BACKGROUND OF THE INVENTION

1. Field

The present invention relates to a block chain technology, and more particularly, to a block chain-based node device, a method of operating the node device, and a system including the node device.

2. Description of the Related Art

A general data management system stores and manages data or files into a cloud storage using a centralized server, and users access to the cloud storage, or request or search data or files from the storage. In this case, not only a mass storage device is required, but a centralized server for managing them is required, and system design and maintenance may be complicated. In addition, when the data or file contains the personal information of the user, as information may not be frequently modified and updated, so a large security accident may occur when the server is leaked or copied, and if a centralized server in which data is concentrated is hacked, there may be a problem that stored data may be forged or falsified and distributed.

Recently, a block chain called as a public transaction ledger has been developed to solve the weak security problems caused by traditional information distribution methods such as the centralized server. The block chain is a technology in which data is distributed and stored by a plurality of nodes participating into an open network, and authentication nodes jointly store data and verify concerned data in order to solve a problem that data forged or modified by hacking is distributed.

In general, data blocks that make up the block chain store data such as transaction history generated over time, and the data is encoded and stored through an encoding process using a hash function, and the data blocks connected to each other in chains may be exposed and shared by all nodes participating into the open network. Therefore, even if an arbitrary node tries to use only some data in a data block, since the entire data block needs to be decoded, the processing time for the data block increases, and hardware demand performance and network traffic for processing the above task may increase.

Each data block configuring the block chain stores a block hash value. The block hash value is a value used for block verification, and since the corresponding node decodes all data contained in the data block, extracts the hash value of the decoded data, and compares it with the block hash value stored in the data block, the data block may be verified. As the amount of data stored in the data block increases, the data decoding time increases, which may cause a problem that the computer resource is excessively consumed.

SUMMARY OF THE INVENTION

The technical problem to be achieved by the present invention is to provide a block chain-based node device for reducing network traffic demand, reducing a processing time for data blocks, reducing hardware resources, and improving the verification time of data blocks.

In addition, another technical problem to be achieved by the present invention is to provide a method for generating a data block having the above-described advantages.

A method of generating a data block according to an embodiment of the present invention may include, a step for obtaining at least one binding data having public or private characteristics; a step for determining a binding key having a decoding permission level for each binding data; a step for encoding the binding data using the binding key; and a step for generating a data block including the encoded binding data, and at least a portion of the binding key.

In one embodiment, the data block may include a header region including index information indicating the type of the at least one binding data, a public region into which a hash value of the at least one binding data stored in the data block is stored, a binding region in which the encoded binding data, and at least a portion of the binding key are stored, and a private region in which encoded private data is stored.

In one embodiment, the header region may further include at least more than one of a hash value of the encoded private region, at least a portion of a first public key that restricts access of an unauthorized node for the data block, and the count number of an integrity verification of the data block.

In one embodiment, the public region may comprise a second public key consisting of a public data including type information regarding a type of information records included in the data block; and at least a portion of an encoded key for decoding the public data.

In one embodiment, the second public key may be used to verify the first public key searched from at least a portion of the first public key. For example, the second public key may include at least portion or all parts of the searched first public key.

In an embodiment, the method may further include a step for additionally storing at least one extended data into the binding region of the data block. For example, the binding key corresponds to a decoding permission level, and the at least one extended data may be encoded according to the decoding permission level.

In one embodiment, the step for additionally storing the extended data may include: a step for storing a piece of index information indicating the type of the extended data into the header region; and a step for storing the hash value of the extended data into the public region.

In one embodiment, a step for reducing the data block to generate a derived data block may be further included. For example, a step for generating the derived data block may comprise a step for storing a binding data selected from the at least one binding data stored in the binding region of the data block, and a binding key corresponding to the selected binding data into the derived binding data region; a step for storing a modification index information indicating the type of the selected binding data into a derived header region; and a step for storing the modified hash value of the selected binding data into a derived public region.

In one embodiment, the index information may include at least any one of bank transaction, health, insurance, education, and finance.

A method for processing a data block according to an embodiment of the present invention may comprise, a step for receiving an encoded data block including at least one binding data having public or private characteristics, and at least a portion of a binding key having a decoding permission level for each binding data; a step for identifying the binding data to be accessed according to a decoding permission level for the binding data; a step for extracting at least a portion of a binding key for the identified binding data; and a step for decoding the binding data by using at least a portion of the extracted binding key.

In one embodiment, a step for decoding the binding data by using at least a portion of the extracted binding key may include: a step for searching the entire contents of the binding key from at least a portion of the extracted binding key; and a step for decoding the binding data by using the searched binding key.

In one embodiment, the method for processing the data block further comprises, a step for decoding a header region including at least more than one of a piece of index information indicating a type of the at least one binding data, a hash value of the encoded private region, at least a portion of a first public key to restrict access of the unauthorized node to the data block, and an integrity verification count of the data block; and a step for decoding a public region consisting of a public data including a type of information included in the data block and a hash value of the binding region matching the type of information; and a second public key including at least a portion of an encoding key for decoding the public data, based on the information of the decoded header region.

In one embodiment, the method further may include a step for searching the entire contents of the first public key from at least a portion of the first public key; and a step for verifying the searched first public key by comparing at least a portion of the searched first public key and at least a portion of the second public key.

In one embodiment, the method of processing the data block may further include a step for confirming the type of the binding data through the index information.

In one embodiment, the method of processing the data block may further include a step for confirming a type of information record included in the data block.

In one embodiment, the method of processing the data block may further include a step for verifying the decoded binding data by comparing the hash value of the binding region and the hash value of the decoded binding data.

In one embodiment, the method of processing the data block may further include a step of additionally storing at least one extended data into the binding region of the data block. For example, the binding key corresponds to a decoding permission level, and the at least one extended data may be encoded according to the decoding permission level.

In one embodiment, the step of additionally storing the extended data may include: a step for storing a piece of index information indicating the type of the extended data in the header region; and step for storing the hash value of the extended data into the public region.

In one embodiment, the method for processing the data block may further include a step for generating a derived data block by reducing the data block. For example, the step for generating the derived data block may comprise, a step for storing the binding data selected from the at least one binding data stored in the binding region of the data block, and a binding key corresponding to the selected binding data into the derived binding data region; a step for storing modified index information indicating a type of the selected binding data into a derived header region; and a step for storing a modified hash value of the selected binding data into a derived public region.

In one embodiment, the method of processing the data block may further include a step for decoding and verifying at least any one binding data among binding data stored in the binding region of the data block. A node device or data processing system using a structure of a data block according to an embodiment of the present invention multiplexes decoding rights for encoded information in the data block structure. The data block structure includes a header region, a public region, a binding region, and a private region; and the header region includes at least any one of a piece of index information indicating a type of the binding region, a hash value of the private region, and at least portion of the first public key restricting access of an unauthorized node to the data block, and the count number of the integrity verification of the data block. The public region includes at least any one of a public data including a piece of type information regarding a type of information records included in the data block, a second public key including at least a portion of an encoded key for decoding the public data, and a hash value of the binding region matching the type information. The above-mentioned binding region includes at least one binding data having public or private characteristics, and at least one binding key having a decoding permission level for the at least one binding data. The at least one binding data and the at least one the binding key form a pair. The private region may include a private data that may be decoded by the node device, and a hash value of the private data.

A data block processing node according to an embodiment of the present invention may include a memory; and at least one processor. For example, the processor may receive an encoded data block comprising at least one binding data having public or private characteristics, and at least a portion of a binding key having a decoding permission level for each binding data. Further, it may confirm an accessible binding data according to a decoding permission level for the binding data, extract at least a portion of the binding key for the confirmed binding data, and decode the binding data by using at least a portion of the extracted binding key.

In one embodiment, the processor may search the entire contents of the binding key from at least a portion of the extracted binding key, and decode the binding data using the searched binding key.

In one embodiment, the processor may decode a header region including at least more than one element selected from at least a portion of a piece of index information indicating the type of the at least one binding data, a hash value of the encoded private region, at least a portion of the first public key to restrict access of the unauthorized node to the data block, and the count mumber of integrity verification of the data block; and may decode a public region consisting of a public data including a type of information included in the data block, a hash value of the binding region matching the type of information, and a second public key including at least a portion of an encoding key for decoding the public data, based on the information of the decoded header region.

In one embodiment, the processor searches the entire contents of the first public key from at least a portion of the first public key, and compares at least a portion of the searched first public key with at least a portion of the second public key, so that the searched first public key may be verified.

In one embodiment, the processor may confirm the type of the binding data through the index information.

In one embodiment, the processor may confirm the type of information record included in the data block.

In one embodiment, the processor may verify the decoded binding data by comparing the hash value of the binding region with the hash value of the decoded binding data.

In one embodiment, the processor may additionally store at least one extended data in the binding region of the data block. In addition, the binding key corresponds to a decoding permission level, and the at least one extended data may be encoded according to the decoding permission level.

In one embodiment, the processor may store a piece of index information indicating the type of the extended data into the header region, and store a hash value of the extended data into the public region.

In one embodiment, the processor reduces the data block to generate a derived data block, and stores the selected binding data among the at least one binding data stored in the binding region of the data block; and a binding key corresponding to the selected data into the derived binding data region. Then, the modified index information indicating the type of the selected binding data may be stored in the derived header region, and the modified hash value of the selected binding data may be stored in the derived public region.

In one embodiment, the processor may decode and verify at least one of the binding data stored in the binding region of the data block.

A data processing system shared among a plurality of nodes according to an embodiment of the present invention may comprise, a data block generation node which acquires at least one binding data having public or private characteristics, determines a binding key having a decoding permission level for each binding data, encodes the binding data by using the binding key, and generates a data block that includes the encoded binding data and at least a portion of the binding key; and a data block processing node which receives an encoded data block including at least one binding data having the public or private characteristics; and at least a portion of a binding key having a decoding permission level for each binding data, verifies the accessible binding data according to the decoding permission level for the binding data, extracts at least a portion of the binding key for the verified binding data, and decodes the binding data using at least a portion of the extracted binding key.

According to an embodiment of the present invention, a node device wherein the network traffic demand is reduced, the processing time for the data block is reduced, the hardware resource is reduced, and the verification time of the data block is improved by multiplexing the decoding permission for the encoded information in the data block may be provided.

Further, according to another embodiment of the present invention, a method for generating a data block for easily generating a data block having the above advantages may be provided.

In addition, according to another embodiment of the present invention, the amount of hardware resources required for data decoding and verification, and network resources due to data block transmission may be reduced by enabling the data blocks to be divided and recombined based on the multiplexed decoding permission level.

BRIEF DESCRIPTION OF THE DRAWINGS

FIG. 5A is an exemplary view for explaining an operation for adding binding data in a data block according to an embodiment of the present invention.

DETAILED DESCRIPTION OF THE INVENTION

Figure 1:
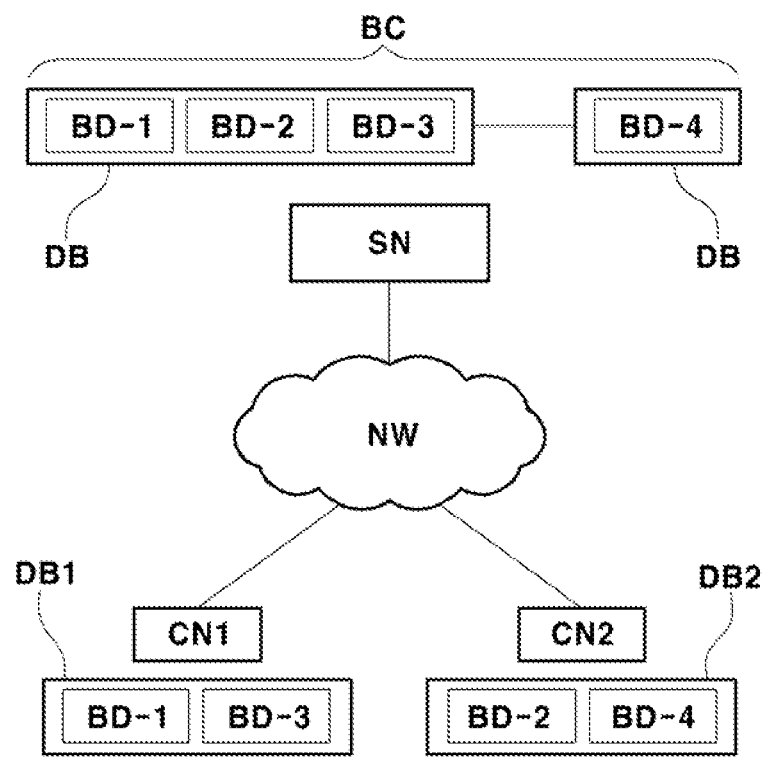
FIG. 1 shows a data processing system based on a block chain according to an embodiment of the present invention.

Hereinafter, the preferred embodiments of the present invention will be described in detail with reference to the accompanying drawings.

The embodiments of the present invention are provided to more fully describe the present invention to those having a common knowledge in the related art, and the following embodiments may be modified in various other forms, and the scope of the present invention is not limited to the following embodiments. Rather, these embodiments are provided to make the present invention more clearly and complete, and to fully convey the spirit of the present invention to those skilled in the art.

In addition, in the following drawings, a thickness or a size of each layer is exaggerated for convenience and clarity of description, and the same reference numerals in the drawings refer to the same elements. As used herein, the term, "and/or" includes any one and all combinations of one or more of the listed items The terminology used herein is used to describe a specific embodiment and is not intended to limit the present invention. As used herein, a singular form may include plural forms unless the context clearly indicates otherwise. Also, as used herein, the term such as "comprise" and/or "comprising" specifies the mentioned shapes, numbers, steps, actions, members, elements and/or the presence of these groups, and does not exclude the presence or addition of one or more other shapes, numbers, actions, members, elements and/or presence or addition of groups.

Although the terms, such as the first, the second, etc. are used herein to describe various members, components, regions, layers and/or portions, it is obvious that these members, components, regions, layers and/or portions are not defined by these terms. These terms are only used to distinguish one member, component, region, layer or portion from another region, layer or portion. Accordingly, the first member, component, region, layer or portion as described below may refer to the second member, component, region, layer or portion without departing from the teachings of the present invention.

Hereinafter, the embodiments of the present invention will be described with reference to the drawings schematically showing ideal embodiments of the present invention. In the drawings, for example, the size and shape of the members may be exaggerated for convenience and clarity of description, and in actual implementation, modifications of the illustrated shape may be expected. Accordingly, embodiments of the present invention should not be construed as limited to the specific shapes of the members or regions shown herein. Hereinafter, various embodiments of the present invention will be described with reference to the drawings.

FIG. 1 shows a data processing system 10 based on a block chain BC according to an embodiment of the present invention.

Referring to FIG. 1, the data processing system 10 includes a plurality of nodes, such as a first client node CN1, a second client node CN2, and a server node SN, and the first client node CN1, the second client node CN2 and the server node SN may be connected to each other on a network NW. In FIG. 1, a configuration in which two client nodes CN1 and CN2 and one server node SN are connected to the network NW is illustrated as an example, but two or more client nodes and one or more server nodes SN may be connected to the network NW. In the present invention, the server node SN may indicate a node including the entire data block DB in the block chain BC, and the client nodes CN1 and CN2 may indicate a node storing only data blocks containing information necessary for itself.

Each node may have the same structure or different configuration. In one embodiment, each node in the data processing system 10 may include a block generation unit 602, a storage unit 604, and a communication unit 606, as described below with reference to FIG. 6. Furthermore, it may be implemented by at least any one of Tablet PC, Laptop, Personal Computer (PC), Portable Multimedia Player (PMP), Wireless Communication Terminal, Smart Phone and Mobile Communication Terminal (Mobile Communication Terminal).

In one embodiment, the server node SN may store at least one block chain BC in which a plurality of data block DBs are chained to each other like a chain. For example, one first data block DB may include three binding data BD-1, BD-2, BD-3, and the other second data block BD may include one binding data BD4. The first data block DB and the second data block DB may be connected via a chain. In one embodiment, the chain connection may mean that the second data block DB has a connection between the first data block DB since the second data block DB includes information on the block hash value of the first data block DB.

In one embodiment, each data block DB configuring the block chain BC may include at least one binding data BD-1, BD-2, BD-3, BD-4 having a permission level, and the binding data BD-1, BD-2, BD-3, BD-4 may be decoded only by a node having an permission level. For example, the binding data may include at least any one of at least one public data designated to be publicized, and at least one private data designated not to be publicized. In one embodiment, the server node SN may receive the data blocks DB generated by the client nodes CN1 and CN2 and connect the data blocks DB over time to generate and store the block chain BC. However, this is only exemplary, and the present invention is not limited thereto. For example, the server node SN may receive and store the respective block chains BC generated by the client nodes CN1 and CN2.

In one embodiment, in response to a request from at least any one of client node CN1, CN2, the server node SN may send the stored block chain BC or at least a portion of the data block DB configuring the block chain BC to the first client node CN1 and/or the second client node CN2.

In one embodiment, the first client node CN1 and the second client node CN2 may generate a data block DB that is an element of the block chain BC. In one embodiment, each data block DB may include a binding data BD to which a permission level has been granted to be decoded at a specific node, as described later with reference to FIG. 2. The binding data BD to which the permission level has been granted may be encoded in order that only nodes having a specified permission level among the nodes included in the data processing system 10 may read and write the biding data BD. Specifically, multiplexing decoding authority for the binding data BDs in a data block, nodes having a corresponding permission level may decode the corresponding binding data BD.

In one embodiment, at least any one node of the first client node CN1 and the second client node CN2 may extract and store some of data block DB of the block chain BC stored in the server node SN. For example, as shown in the drawings, the first client node CN1 may extract the binding data (for example, BD-1 and BD-3) corresponding to its permission level from the entire data block DB in the block chain BC, and may store the data block DB1. Alternatively, the first client node CN1 may request the binding data (for example, BD-1 and BD-3) corresponding to its permission level to the server node SN, and then store the data block DB1 including the binding data (for example, BD-1 and BD-3). Similarly, the second client node CN2 may store a data block DB2 including binding data (for example, BD-2 and BD-4) corresponding to its permission level from the entire data block DB in the block chain BC or may request the binding data (for example, BD-2 and BD-4) corresponding to their permission level to the server node SN and then store the data block DB2 including binding data (for example, BD-4 and BD-4).

Figure 5B:
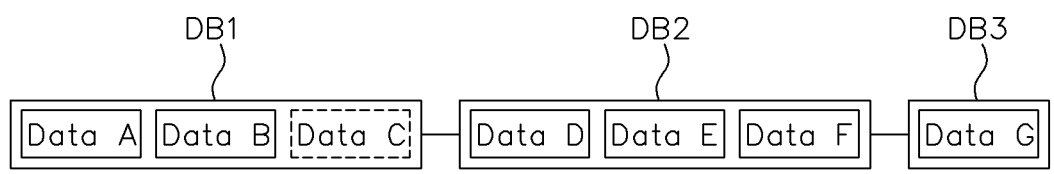
FIG. 5B is an exemplary view illustrating an operation for deleting a binding data in a data block.
Figure 5C:
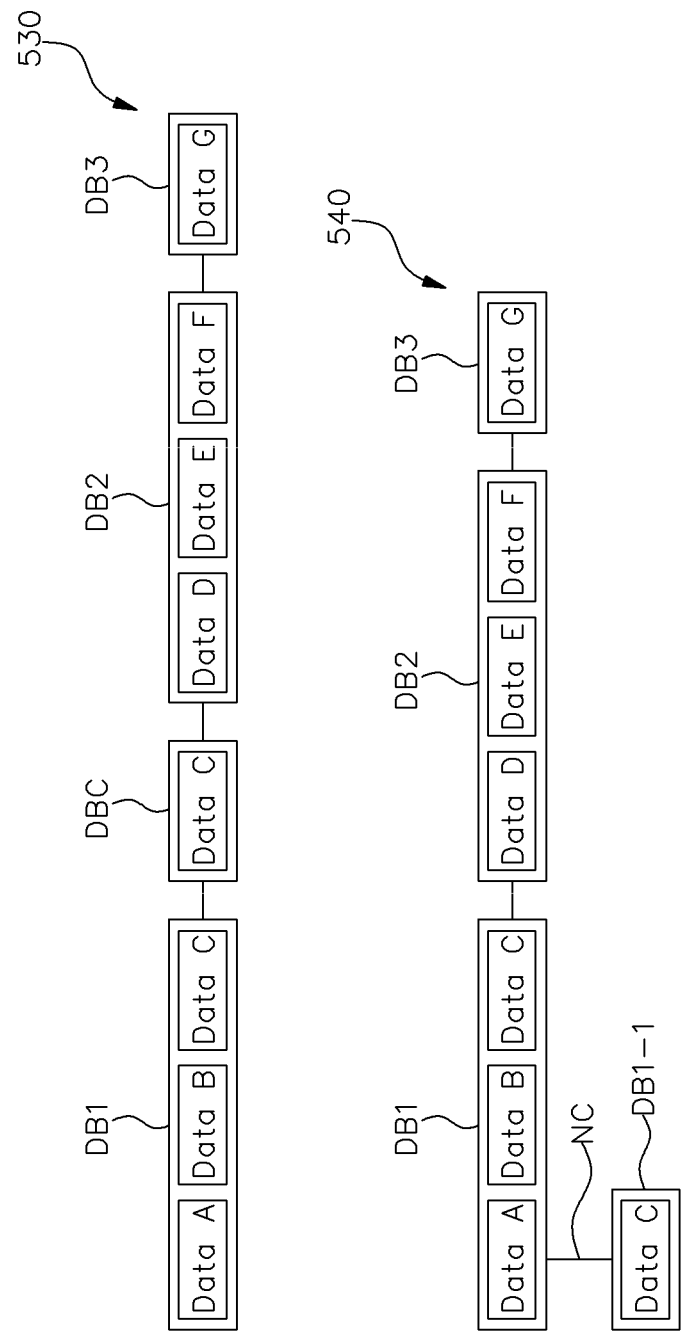
FIG. 5C is an exemplary diagram for explaining the operation of replicating the data block.
Figure 5D:
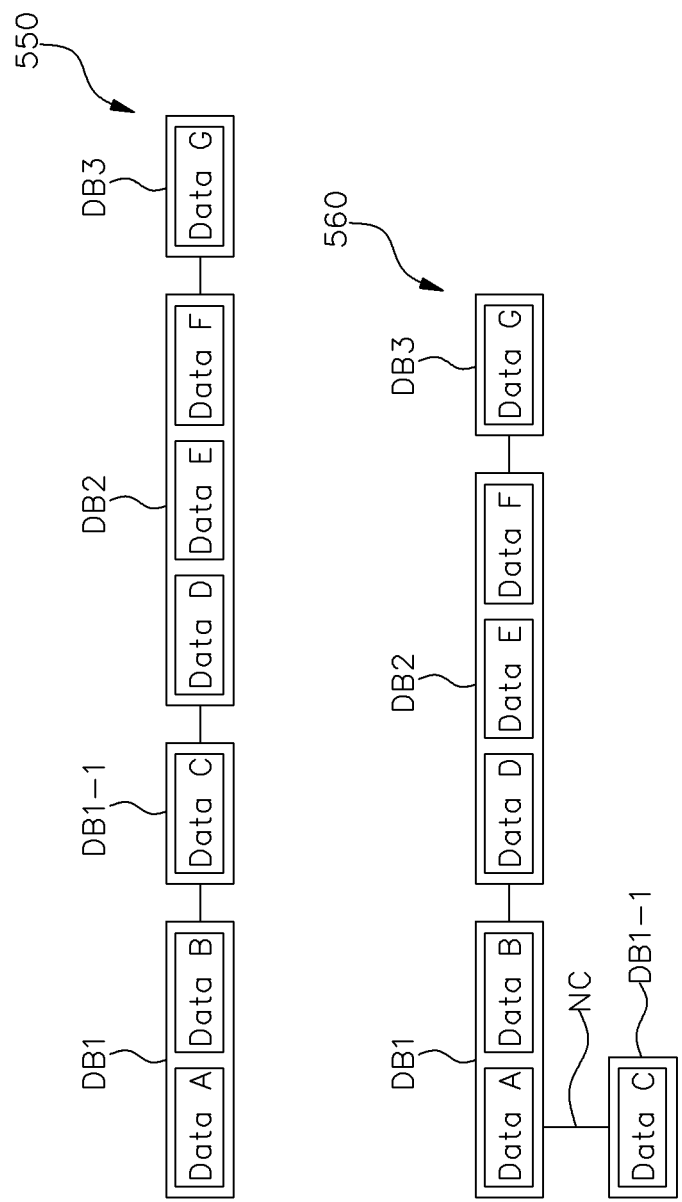
FIG. 5D is an exemplary diagram for explaining the operation of integrating the data block.
Figure 5E:
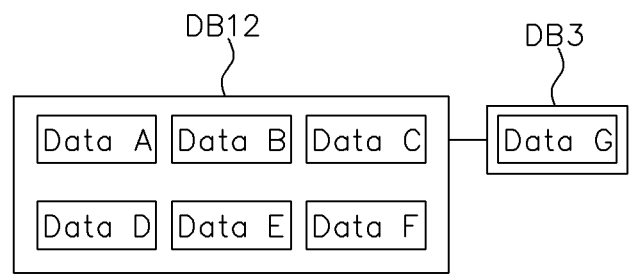
Fig. 5E is an exemplary diagram for explaining the operation of merging the data block.

In addition, a new data block BD may be added in the block chain BC stored in the server node SN of FIG. 1, or a new binding data may be further added to the data block BD (FIG. 5A), and the existing data block BD may be deleted in the block chain BC stored in the server node SN, or the existing binding data may be deleted in the data block BD (FIG. 5B). Some of the binding data may be copied from the data block BD in the block chain BC stored in the server node SN to generate new block data (hereinafter referred to as a reduced replication, FIG. 5C). Then, a portion of the binding data may be extracted from the data block BD in the block chain BC stored in the server node SN to generate new block data (hereinafter referred to as division, FIG. 5D). In another embodiment, as shown in FIG. 5E to be described later, two data blocks may be merged into one data block.

In an implementation, the first block chain BC among the plurality of block chains BC may be a block chain BC operated in a financial company, and the second block chain BC may be a block chain BC operated in an insurance company. The third block chain BC may be a block chain BC operated in a hospital, and the fourth block chain BC may be a block chain BC operated in a government office. Each of these block chains BC may be divided by a data transmission/reception protocol between each node, and through adjustment of the protocol, the financial company's first block chain BC may be connected to at least one data block BD extracted from a second block chain BC, a third block chain BC, a fourth block chain BC, or a combination thereof through a chain.

As described above, by accommodating public data or private data into the region of binding data BD of the data block DB, it is possible to commonly accommodate important information that should not be disclosed in the block chain structure and information that needs to be disclosed in the block chains. In addition, since the addition or deletion of the binding data BD in the data block DB, the addition or deletion of the data block DB in the block chain BC, the merging of the data block DB in the block chain BC, and the reduced replication and division of the data block DB may be performed, the data blocks may be flexibly used. In addition, it is possible to reduce the network traffic demand according to the block transmission and to reduce hardware resources by extracting a portion of the original data block and generating a data block that is reduced and generated according to the purpose.

In addition, the decoding permission for the encoded binding data in the data block may be multiplexed so that when the node storing the specific data block DB decodes the data block DB, the node can decode a portion of a block chain, and thus the processing time of the data block may be reduced and the verification time of the data block may be improved as compared with the conventional case where the data block should be entirely decoded. Due to these advantages, it is possible to reduce the required amount of hardware resources for data decoding and verification and network resources for data block transmission.

In addition, by distinguishing the owners of data blocks (e.g., financial companies, insurance companies, hospitals), it is possible to additionally implement a data transaction system within the block chain, and to reduce hardware resource requirements for data mining by providing a public key that is only partially public rather than fully public.

In addition, it is possible to find a block containing the desired data before decoding the block or to implement the integrity of the decoded data through a simple process by using the hash value of the encoded region in the data block for chain connection.

Figure 2:
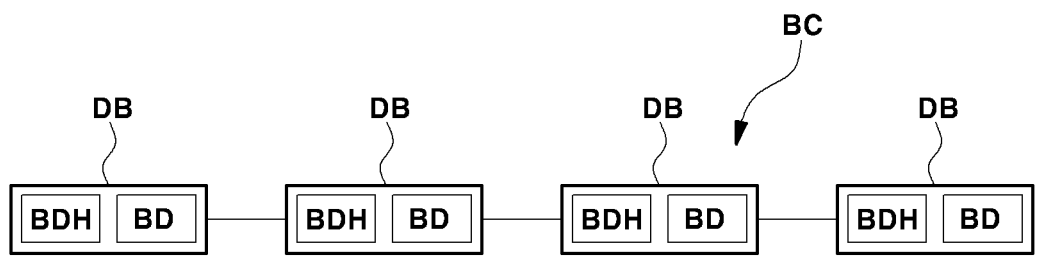
FIG. 2 is a diagram showing the configuration of a block chain BC according to an embodiment of the present invention.

FIG. 2 is a diagram showing the configuration of a block chain BC according to an embodiment of the present invention.

Referring to FIG. 2, the block chain BC is formed by connecting a plurality of data blocks DB as a chain format, and each data block DB may include a binding data BD and a hash value BDH expressing binding data BD as a unique value. Also, each data block may store its own block hash value. For example, its block hash value may be determined by the hash value of the binding data BD of the previous data block and a hash function using the binding data in its data block as inputs. However, this is only exemplary, and the present invention is not limited thereto. For example, since the data blocks that make up a typical block chain also contain the hash value of the previous block, each data block in the block chain may be connected to each other like a chain, and the hash value of the previous block may be used to generate the block hash. Furthermore, the data block may further include a nonce value and a time stamp.

In one embodiment, the block chain BC may be distinguished for each node. For example, the block DBs created by a first client node (refer to CN1 in FIG. 1) are connected to a first block chain defined as a first client node, and the blocks generated by a second client node (refer to CN2 in FIG. 1) may be connected to a second block chain defined as a second client node. Also, the block chain may not distinguish the nodes. For example, one block chain is defined in the data processing system 10, and the blocks generated at each node may be sequentially connected to the block chain according to the creation time.

Figure 3:
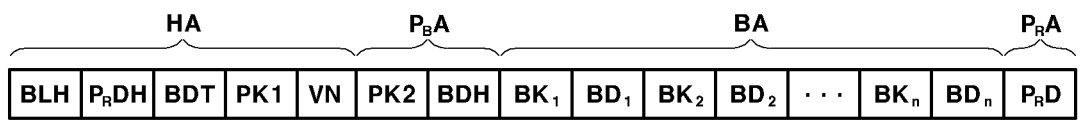
FIG. 3 is a diagram showing the configuration of a data block according to an embodiment of the present invention.

FIG. 3 is a diagram showing the configuration of a data block DB according to an embodiment of the present invention.

Referring to FIG. 3, the data block DB may be composed of a header region HA, a public region $P_B A$, a binding region BA, and a private region $P_R A$, and the binding data BD may be decoded by a node having a specified permission level, and the private data $P_R D$ may decoded only by a node primally generating the data block DB. However, the present invention is not limited to these, and the private data $P_R D$ may be decoded by the owner of the block chain BC, that is, a node having the permission of an insurance company, a financial company, or a hospital. Alternatively, the private data $P_R D$ may be decoded by the client's node using an insurance company, a financial company, or a hospital which that owns a block chain. In addition, the header region HA may include a block hash value BLH, a hash value $P_R DH$ of private data $P_R D$, an index BDT of binding data BD, a first public key PK1, and the count number VN of integrity verification.

In one embodiment, the block hash value BLH serves as an identifier of the data block DB and may be generated by applying a pre-set hash algorithm to the hash value of the binding data BD having a permission level stored in the data block. As another example, when generating a block hash value BLH, a hash algorithm may also be applied to other information stored in the data block BD, such as a hash value $P_R DH$ of the private data $P_R D$ and an index BDT of the binding data BD, and the like.

In one embodiment, the hash value $P_R DH$ of the private data $P_R D$ serves as an identifier of the private data $P_R D$ stored in the private data region $P_R A$, and may be a hash value for the Merkle tree root generated from the stored private data $_R D$. For example, when the first private data to the third private data are stored, a hash value that sums up the hash value of the first private data and the hash value of the second private data is generated, and a new hash value is obtained by summing up the above hash values and the new hash value and the hash value of the third private data are summed to generate a final hash value. Then, the final hash value may be used as the hash value of the private data.

In one embodiment, the index BDT of the binding data may be a piece of information indicating the type of the binding data BD stored in the binding data region BA. For example, an index information may include a piece of information indicating at least any one of data related to the financial industry, data related to the medical industry, and data related to the insurance industry. Also, the index information may include a piece of information indicating the level of permission granted to each binding data BD.

In one embodiment, the first public key PK1 may be information used to calculate a decoding key for decoding a binding region. For example, the first public key PK1 may be provided as a format in which at least a portion thereof is publicized and the other portion is not publicized. Due to this, an unauthorized node included in the network NW may not know the decoding key, and thus may be restricted to decode the data block DB. Also, the degree of disclosure of the first public key PK1 may be changed. For example, when the first public key PK1 has a high degree of disclosure, time and hardware requirements for calculating the decoding key may be reduced as compared to other case where the first public key PK1 has not so high degree.

In one embodiment, the count number of integrity verifications VN represents the number of error verifications performed on the data blocks or a binding data.

In one embodiment, the public region $P_BA$ may include the second public key PK2 and a hash value BDH of binding data BD. For example, the second public key PK2 is information used to determine whether the decoding key obtained by using the first public key PK1 is a normal key or not. When the decoding key calculated with the first public key PK1 and the second public key PK2 are compared, if the two keys are the same, it may be determined that a normal key has been obtained. Also, the second public key PK2 may be provided as a format in which at least a portion thereof is not disclosed. For example, an encoding key for decoding the binding region may be obtained by decoding the second public key PK2 with the encoding key calculated by using the first public key PK1 and then by calculating the first public key (PK1) and the second public key PK2. This means that a public key that is only partially disclosed rather than a public key that is entirely disclosed in the open block chain is provided, thereby reducing the hardware resource requirement for data decoding.

In one embodiment, the binding region BA may include a plurality of binding keys BK1, BK2, . . . , BKn, and the binding data BD1, BD2, . . . , BDn which may be decoded by each of the binding keys BK1, BK2, . . . , BKn. For example, the plurality of binding keys BK1, BK2, . . . , BKn may have different permission levels. In addition, the binding data BD1, BD2, . . . , BDn may include an information record such as an age, a residence region, an occupation, an income level, and an asset status, which may not be personally specified as information that may be disclosed to other nodes. In addition, type information on the type of information records included in the binding region may be stored in the public region $P_BA$.

In one embodiment, the private region $P_RA$ may include private data $P_RD$ that may only decode the generating node that generated the data block DB. For example, the private data $P_RD$ may be decoded only by a decoding key separately owned by the generating node. For example, the private data $P_RD$ is information that should not be disclosed to other nodes, and may include personally identifiable information such as, for example, social security numbers, names, and so on.

Figure 4:
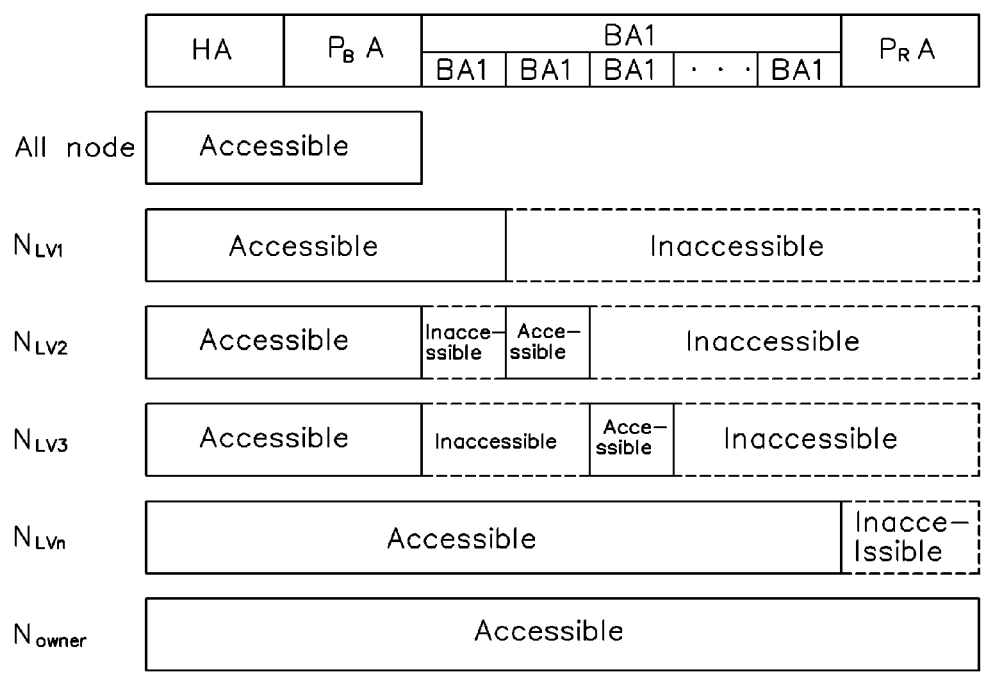
FIG. 4 is a diagram illustrating access permission for each node of a data block according to an embodiment of the present invention.

FIG. 4 is a diagram illustrating access permission for each node for a data block DB according to an embodiment of the present invention.

Referring to FIG. 4, a plurality of binding data stored in the data block DB has respective permission levels, and the nodes may access and decode only the binding data corresponding to their permission level from the data block DB. For example, the nodes may extract the public key from the header region HA of the data block DB, and decode the public region $P_BA$ by using the extracted public key and therefore, a binding data corresponding to the permission level of the user may be confirmed.

In one embodiment, the header region HA and the public region $P_BA$ of the data block DB are the regions which may be used for identifying binding data that nodes may decode, and all nodes included in the data processing system may access to these regions HA and $P_BA$.

In one embodiment, the authorities ranging from level 1 to level n may be defined, and level 1, level 2, and level 3 are the levels which may be accessed to the first region BA1, the second region BA2, and the third region BA3 of the binding region BA. Level n may be assumed to be a level accessible to the entire region of the binding region BA.

Therefore, the node Nun having the permission of level 1 may analyze the header region HA and the public region $P_BA$ of the data block DB, and determine that a binding data which is able to access the first region BA1 of the binding region BA is included. Then, the binding data may be decoded by using the binding key stored in the first region. Similarly, each node $N_{LV2}$, $N_{LV3}$ having the permission of level 2 and level 3 may also decode only the binding data stored in the second region and the third region of the binding region, respectively. In addition, the node $N_{LVn}$ having the permission of level n may access to all regions of the binding region and may decode at least one binding data desired by the node.

In addition, the generating node $N_{owner}$ who primarily generated the data block DB may have the highest permission level for the data block DB. Accordingly, the generation node $N_{owner}$ may decode some binding data or all binding data, and additionally may also decode private data stored in the private region $P_RA$. Although not illustrated, access to all nodes may be restricted even for at least one binding data stored in the binding region.

FIG. 5A is an exemplary view for explaining an operation for adding binding data BD in a data block DB according to an embodiment of the present invention, and FIG. 5B is an exemplary view illustrating an operation for deleting a binding data BD in a data block DB. FIG. 5C is an exemplary diagram for explaining the operation of replicating the data block DB, and FIG. 5D is an exemplary diagram for explaining the operation of integrating the data block, and FIG. 5E is an exemplary diagram for explaining the operation of merging the data block.

In one embodiment, the block chain has a configuration in which a plurality of data blocks are connected to each other, and each data block may include at least one binding data having a permission level. For example, as shown in this exemplary diagrams, the first data block DB1 may include three binding data (data A, data B and data C), and the second data block DB2 may also have three binding data (data D, data E and data F). The third data block DB3 may include one binding data (data G), and the first data block DB1, the second data block DB2, and the third data block DB3 may be connected to each other to form a block chain BC.

Referring to FIG. 5A, at least one node receiving a block chain BC may add new binding data in a data block. For example, as shown in 510 of FIG. 5A, the node may add binding data H to the first data block DB1 of the previously created block chain BC. At this time, a binding data may be added in consideration of the size of the first data block DB1. For example, when the size of the first data block DB1 exceeds the predetermined size by the addition of the binding data H, the binding data H may be added in a divided format or a compressed format according to the predetermined size of the first data block DB1. Further, a piece of index information indicating the type of the added binding data may be stored in the header of the data block, and the hash of the added binding data may be stored in the public region of the data block. However, this is only exemplary, and the present invention is not limited thereto. For example, as shown in 520 of FIG. 5A, a new data block DB4 including data H may be generated, and a new chain NC may be formed together with the first data block DB1. At this time, the first data block DB1 may become a parent data block, and the newly added (or derived) data block DB4 may become a child data block, and information indicating this relationship may be added to each data block. In addition, a piece of index information indicating the type of the binding data, and the hash of the added binding data may be stored into the header and the public region of the newly added data block DB4, respectively.

In one embodiment, as contrary to adding binding data in a data block, a binding data stored in the data block may be deleted. For example, as shown in FIG. 5B, the node may store the data block DB1 composed of data A and data B by deleting the data C stored in the previously generated first data block DB1 of the block chain. In addition, index information indicating the type of the deleted binding data may be deleted from the header of the data block, and the hash of the deleted binding data may also be deleted from the public region of the data block.

In one embodiment, at least one node that receives the block chain BC may replicate the previously generated data block DB. For example, as illustrated in FIG. 5C, a node may replicate a portion of data stored in the previously generated first data block DB1 of the block chain and then generate a reduced (or derived) data block DBC as compared to the first data block, and the reduced date block DBC may be connected to the block chain BC. For example, as illustrated in 530 of FIG. 5C, a data block DBC derived by replicating data C may be connected between the first data block and the second data block. As another example, as shown in 540 of FIG. 5C, a data block DBC replicating data C may be generated, and accordingly, a first data block DB1 and a new chain NC may be formed. At this time, a modification index information indicating the type of the replicated binding data and a modification hash of the duplicated binding data may be stored in the header and the public region of the derived data block, respectively.

In an embodiment, at least one node receiving a block chain may divide the one previously generated data block DB into a plurality of data blocks. For example, as illustrated in 550 of FIG. 5D, the node may divide the previously generated first data block DB1 of the block chain into a data block DB1-1 including data A and data B and a data block DB1-2 including data C, and the data block DB1-1 and the data block DB1-2 may be sequentially connected to the block chain BC. As another example, as shown in 560 of FIG. 5D, the divided data blocks may be designated as a parent data block and a child data block according to a predetermined rule. For example, the parent data block DB1-1 may maintain the existing chain configuration, and the child data block DB1-2 may form a new chain NC separated with the parent data block DB1-1. In this case, according to the division of the data block, index information indicating the type of binding data stored in the header and a hash of the binding data stored in the public region may be updated in the parent data block and the child data block.

In an embodiment, as contrary to a step for dividing a data block, a plurality of data blocks may be integrated into one data block. For example, as illustrated in FIG. 5E, the node may generate a data block DB12 formed by integrating the first data block DB1 and the second data block DB2 of the previously generated block chain BC, and may connect the generated data block to block chain BC. At this time, in the integration of the data block, a piece of index information indicating the type of binding data stored in the header of the integrated data block DB12, and a hash of the binding data stored in the public region of the integrated data block DB12 may be updated.

Figure 6:
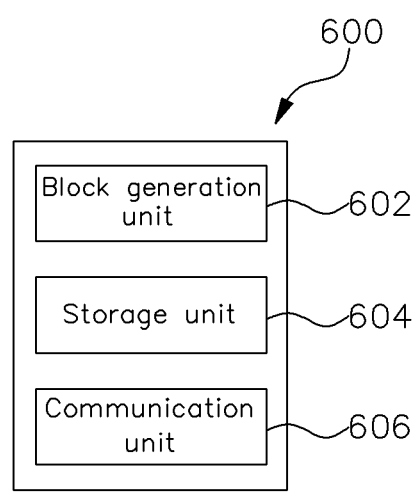
FIG. 6 is a block diagram showing the configuration of a node according to an embodiment of the present invention.

FIG. 6 is a block diagram showing the configuration of a node 600 according to an embodiment of the present invention.

Referring to FIG. 6, a node (600) may be a client node (refer to CN1 and CN2 in FIG. 1) or a server node (refer to SN in FIG. 1) which is an element of the data processing system (refer to 10 in FIG. 1). In one embodiment, the node 600 may include a block generation unit 602, a storage unit 604 and a communication unit 606.

In one embodiment, the communication unit 606 may establish communication (NW) between at least one and other nodes. For example, the communication unit 606 may form the communication through wireless communication or wired communication. For example, the wireless communication may include a cellular communication using at least any one of LTE, LTE-A (LTE Advance), code division multiple access (CDMA), wideband CDMA (WCDMA), universal mobile telecommunications system (UMTS), or Global System for Mobile Communications (GSM). Further, the wireless communication may include a short-range communication using at least any one of WiFi (wireless fidelity), LiFi (light fidelity), Bluetooth, Bluetooth low power (BLE), Zigbee, and near field communication (NFC). In another embodiment, the wired communication may include at least any one of a universal serial bus (USB), high definition multimedia interface (HDMI), recommended standard-232 (RS-232), power line communication, or plain old telephone service (POTS) and system bus.

The storage unit 604 may store various data used by at least one component (for example, the block generation unit 602 or the communication unit 606), for example, input data or output data for software and commands related thereto. The storage unit 604 may include volatile memory or nonvolatile memory. In one embodiment, the storage unit 606 may be at least one memory region in which a data block DB or a block chain BC where data blocks DB are connected to each other are stored.

In one embodiment, the block generation unit 602 drives at least one software stored in the node to control at least one other component (for example, the storage unit 604, or the communication unit 606) connected to the block generation unit 602, and may perform various data processing and operations. For example, the block generation unit 602 may be at least one processor that processes the overall operation of the node.

In one embodiment, the block generation unit 602 may generate a primal or initial block that is the beginning of a block chain. The primal block may store a private data that only the generating node may access, and a hash value of the encoded private data may be used as a hash value that identifies a block associated with the first block. For example, the block generation unit 602 may encode the private data by using the private key held by the node 600, and generate a hash value for each of the encoded private data.

In one embodiment, the block generation unit 602 may generate a data block DB that configures the block chain BC. For example, the block generation unit 600 may generate a data block DB including at least one binding data (refer to BD-1, BD-2, BD-3, BD-4 in FIG. 1) having a permission level. The data block DB may be a data block including information of a user registered to a specific entity, and in this case, a data block DB may be generated whenever a new user is registered in the entity. However, this is only exemplary, and the present invention is not limited thereto. For example, the data block DB may be periodically generated at regular time intervals, for example, 10 minutes.

In one embodiment, the block generation unit 602 may request a verification of work to other nodes in the network NW to connect the generated data block DB to the block chain BC. The verification of work may mean agreeing with another node to update the block chain with data blocks generated by a generation node. For example, the block generation unit 602 may request the verification of work by transmitting the generated data block DB to other nodes, and the verification nodes requested for the verification of work may calculate a value that satisfies a specified condition by calculating a hash value of the received data block and a random nonce value with a preset verification algorithm. At this time, the verification node may perform arithmetic operations while changing the nonce value until the calculated value satisfies the specified condition, and the verification node calculating the value satisfying the specified condition may report a verification completion state to the generation node. In addition, when the value of verification nodes that have completed verification satisfies the specified value, the block generation unit 602 may update the block chain BC by linking the generated data blocks with the block chain BC.

In one embodiment, the block generation unit 602 may process the previously generated chain BC. A step for processing the block chain BC may include a process for adding at least one binding data BD into at least one data block DB that is an element of the block chain BC. In addition, deletion of at least any one among at least one binding data BD included in the data block DB, reduction replication of the previously generated data block DB, and integration of the previously generated data block DB may be considered as an operation of processing. In one embodiment, the block generation unit 602 may change a header information of the processed data block DB. For example, the information indicating the hash value of the changed binding data BD and the type of the changed binding data BD according to the deletion or addition of the binding data BD may be written into a public region of the data block (refer to BDH field in FIG. 3), and the header region of the data block (for example, refer to the BDT field in FIG. 3), respectively.

In one embodiment, the block generation unit 602 may store the processed data block DB in the storage unit 604 or transmit it to another authenticated node connected to the network NW. At this time, another authenticated node may include a server node and a different client node, and these nodes may store the received data block in the storage unit. In addition, at least one node, for example, a server node may store both of a post-processed data block and a free-processed data block. Due to this, it is possible to prevent a portion of the binding data stored in the primal data block from being permanently deleted by any processing operation.

In one embodiment, the block generation unit 602 may transmit at least some data block DBs configuring the block chain BC to other nodes. At this time, when the block generation unit 602 receives a transaction including information on the request data from another node, the block generation unit 602 may analyze the header of the data block DB stored in the storage unit 604, identify the data block DB corresponding to the transaction, and transmit the identified data block DB to the requesting node.

As described above, the node storing the data block DB may save hardware resources required for decoding, as compared to the method of decoding the entire block chain by decoding only a portion of the block chain when decoding the data block DB. However, this is only exemplary, and the present invention is not limited thereto. For example, some data blocks DB may be one data block DB formed only of binding data BD having a permission level that does not correspond to the permission of a node among the binding data BD included in the block chain BC. The node storing the above-described data block DB and having no permission level for decoding the data block DB may not decode the data block DB for decoding the data block DB, but it is possible to save network resources as compared to a conventional method of providing the entire block chain BC, by providing the above-described data block DB to another node which may be decoded.

Figure 7:
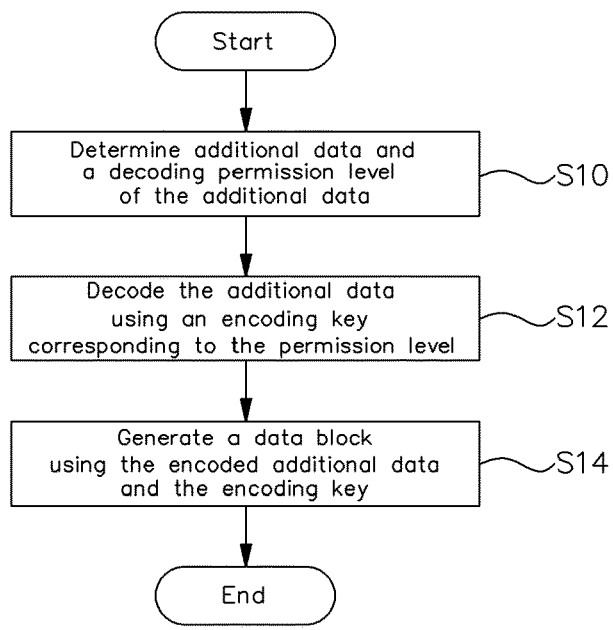
FIG. 7 is a flowchart illustrating an operation for generating a data block according to an embodiment of the present invention.

FIG. 7 is a flowchart illustrating an operation of generating a data block DB according to an embodiment of the present invention. The data block DB may be generated by a client node (refer to CN1 and CN2 in FIG. 1) and a server node (refer to SN in FIG. 1) included in the data processing system 10, and In the following description, a node for generating a data block DB is referred to as a 'generation node' for convenience of description.

Referring to FIG. 7, the generation node may determine a to-be-added binding data BD (or extended data) to the data block DB and a decoding permission level (S10). The binding data BD may be data to which a certain level of permission level is granted so that decoding may be possible only by a node having a designated permission level.

Thereafter, the generating node may encode the binding data BD using the encoded key BK corresponding to the permission level (S12). The generating node may have a plurality of encoded keys having different permission levels, and then obtain a key corresponding to the permission level to be granted to the binding data BD among these encoded keys.

Thereafter, the generating node may generate the data block DB using the binding data BD and the encoded key BK (S14). As described above with reference to FIG. 3, the binding data BD and the encoded key BK may be added to the binding region BA of the data block DB. In addition, the generating node may add private data $P_RD$ that only the generating node itself may decode as well as the binding data BD to the data block DB, and may generate a header information including a piece of information (for example, a hash value, data type, etc.) describing the data added to the data block DB.

Figure 8:
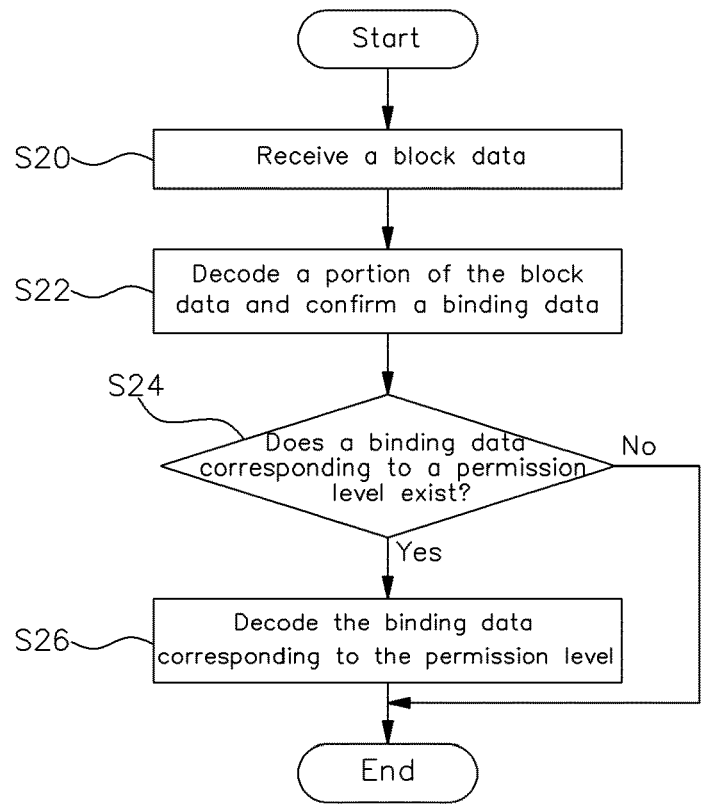
FIG. 8 is a flowchart illustrating an operation for decoding a data block according to an embodiment of the present invention.

FIG. 8 is a flowchart illustrating an operation of decoding a data block DB according to an embodiment of the present invention. The data block DB may be decoded by a client node and a server node included in the data processing system 10, and in the following description, a node for decoding the data block DB will be referred to as a 'receiving node' for convenience of description.

Referring to FIG. 8, the receiving node may receive the data block DB through the network NW (S20). For example, the receiving node may generate a transaction requesting the binding data BD, transmit the transaction to the nodes included in the network NW, and receive a data block DB corresponding to the transaction. For example, the transaction may include a permission level of the receiving node, a piece of category information of binding data BD required by the receiving node, and the like.

Thereafter, the receiving node may decode at least a portion of the received data block DB (refer to the BDH field in FIG. 3) to confirm the binding data BD (S22).

Thereafter, the receiving node may determine whether a binding data BD corresponding to the permission level of the receiving node among binding data BD included in the data block DB, for example, a binding data BD that may be decoded, exists or not (S24).

If the binding data BD corresponding to the permission level does not exist in the data block DB, the receiving node may end the operation of decoding the data block DB.

If the binding data BD corresponding to the permission level exists in the data block DB, the receiving node may decode only the binding data BD corresponding to the permission level in the data block DB (S26).

Figure 9:
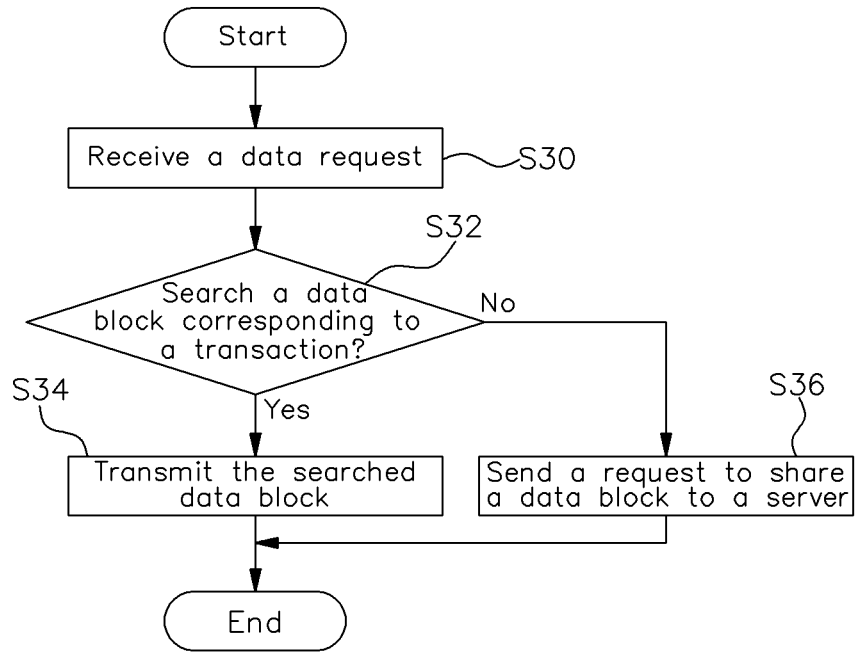
FIG. 9 is a flowchart illustrating an operation of providing a data block according to an embodiment of the present invention.

FIG. 9 is a flowchart illustrating an operation of providing a data block DB according to an embodiment of the present invention. The data block DB may be provided to other nodes by a client node and a server node included in the data processing system 10, and in the following description, a node providing the data block DB is referred to as a 'providing node' for convenience of description.

Referring to FIG. 9, the providing node may receive a data block request through a network NW (S30). For example, the providing node may receive a transaction including a permission level of the requesting node, a piece of category information of a binding data BD required by the requesting node, and the like.

Thereafter, the providing node may analyze the header of the stored data block DB and search for the data block DB corresponding to the transaction (S32).

When the data block DB corresponding to the transaction is searched, the providing node may provide the searched data block DB as the requesting node (S34).

If the data block DB corresponding to the transaction is not searched, the providing node may make a request for sharing the data block DB to the upper node, for example, a server node (S36). For example, the providing node may generate a transaction that includes the permission level of the requesting node, a piece of category information of the binding data BD required by the requesting node, and the like, transmit the transaction to the upper node, receive the data block DB from the upper node and deliver the data block DB to the requesting node. As another example, the providing node may add the address of the requesting node to the transaction and transmit the address to the upper node. In this case, the upper node may search the data block DB corresponding to the transaction and directly transmit it to the requesting node without via the providing node.

Figure 10:
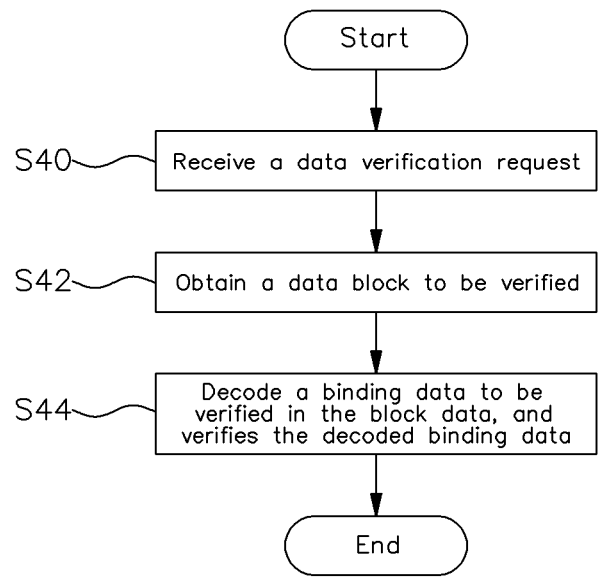
FIG. 10 is a flowchart illustrating an operation for verifying a data block according to an embodiment of the present invention.

FIG. 10 is a flowchart illustrating operations for verifying a data block DB according to an embodiment of the present invention. The data block DB may be verified by a client node and a server node included in the data processing system 10, and in the following description, a node for verifying the data block DB is referred to as a 'verification node' for convenience of description.

Referring to FIG. 10, the verification node may receive a data block verification request through a network NW. For example, the verification node may receive a transaction including information, for example, block hash of the data block DB required to be verified, information of the binding data BD required to be verified, for example, the binding data hash, and the like (S40).

Thereafter, the verification node may obtain a data block DB requiring verification by analyzing the transaction (S42). For example, the verification node may obtain the data block DB corresponding to the transaction by checking the hash value of the stored data block DB.

Thereafter, the verification node may decode and verify the binding data BD that needs to be verified in the data block DB (S44). For example, the verification node may apply a hash algorithm by decoding the binding data BD corresponding to the transaction. In addition, the verification node may complete the verification by comparing the result of the hash algorithm with the hash value (see BDH of FIG. 3) of the binding data included in the data block DB. At this time, if the result of the hash algorithm matches the hash value of the binding data, the integrity of the data block DB may be verified. In addition, the verification node may write a piece of information (see VN in FIG. 3) indicating that verification is completed, into the corresponding data block DB after completing the verification.

A portion or all of a device (or module) or method (for example, step) according to the present invention may be implemented as a form of a program module in a computer-readable storage media, for example, a storage unit of a node by using with a set of storable instructions, a hardware, or a combination thereof. The instructions may be executed by a hardware including one or more processors such as a microchip, and the one or more processors may perform functions corresponding to the instructions.

It will be apparent to those who have the common knowledge in the field related to the present invention that the present invention described above is not limited to the above-described embodiments and the accompanying drawings, and various substitutions, modifications, and changes are possible within the scope of the technological concepts of the present invention.

What is claimed is:

1. A method for generating a data block which configures a block chain and is shared between a plurality of nodes comprises:
    a step for obtaining at least one of a plurality of binding data having public or private characteristics;
    a step for determining a binding key having a decoding permission level for each binding data;
    a step for encoding the binding data using the binding key; and
    a step for generating a data block including the encoded binding data, and at least a portion of the binding key;
    wherein the data block comprises:
    a header region including index information indicating the type of the at least one binding data;
    a public region into which a hash value of the at least one binding data stored in the data block is stored;
    a binding region in which each encoded binding data and at least a portion of its corresponding binding key are stored; and
    a private region in which encoded private data is stored;
    wherein the decoding permission of the plurality of the encoded blinded data in the data block is multiplexed, such that when a node decodes a stored data block, a portion of the data block associated with the permission level is decoded instead of decoding the entire data block.

2. The method for generating a data block of the claim 1, wherein the header region further comprises: at least more than one among a hash value of the encoded private region; at least a portion of a first public key that restricts access of an unauthorized node for the data block; and a count number of an integrity verification of the data block.

3. The method for generating a data block of the claim 1, wherein the public region comprises a public data including a type information regarding a type of information record included in the data block; and a second public key consisting of at least a portion of an encoded key for decoding the public data.

4. The method for generating a data block of the claim 3, wherein the second public key is used to verify the first public key searched from at least a portion of the first public key, and the second public key includes at least portion or all of the searched first public key.

5. The method for generating a data block of the claim 1, further comprising a step for additionally storing at least one extended data into the binding region of the data block, and wherein the binding key corresponds to a decoding permission level, and the at least one extended data is encoded according to the decoding permission level.

6. The method for generating a data block of the claim 5, wherein the step for additionally storing the extended data comprises: a step for storing a piece of index information indicating a type of the extended data into the header region; and a step for storing a hash value of the extended data into the public region.

7. The method for processing a data block of the claim 5, further comprising: a step for decoding a header region including at least more than one of an index information indicating a type of the at least one binding data, a hash value of the encoded private region, at least a portion of a first public key to restrict access of the unauthorized node to the data block, and the count number of an integrity verification of the data block; and a step for decoding a public region including a public data including a type of information included in the data block and a hash value of the binding region matching the type of information; and a second public key including at least a portion of an decoding key for decoding the public data, based on the information of the decoded header region.

8. The method for processing a data block of the claim 7, further comprising a step for searching the entire contents of the first public key from at least a portion of the first public key; and a step for verifying the searched first public key by comparing at least a portion of the searched first public key and at least a portion of the second public key.

9. The method for processing a data block of the claim 7, further comprising a step for confirming a type of the binding data through the index information.

10. The method for processing a data block of the claim 7, further comprising a step for confirming a type of an information record included in the data block.

11. The method for processing a data block of the claim 7, further comprising a step for verifying the decoded binding data by comparing a hash value of the binding region with a hash value of the decoded binding data.

12. The method for processing a data block of the claim 7, further comprising a step for storing at least one extended data into the binding region of the data block, wherein the binding key corresponds to a decoding permission level, and the at least one extended data is encoded according to the decoding permission level.

13. The method for processing a data block of the claim 12, wherein the step for additionally storing the extended data comprises: a step for storing a piece of index information indicating the type of the extended data into the header region; and a step for storing the hash value of the extended data into the public region.

14. The method for generating a data block of the claim 1, further comprising a step for reducing the data block to generate a derived data block, wherein the step for generating the derived data block comprises a step for storing a binding data selected from the at least one binding data stored in the binding region of the data block, and a binding key corresponding to the selected binding data into the derived binding data region; a step for storing a modification index information indicating a type of the selected binding data into a derived header region; and a step for storing a modified hash value of the selected binding data into a derived public region.

15. The method for generating a data block of the claim 1, wherein the index information comprises at least any one of bank transaction, health, insurance, education, and finance.

16. A method for processing a data block which configures a block chain, and is shared among multiple nodes comprises:
 a step for receiving an encoded data block including at least one binding data having public or private characteristics, and at least a portion of a binding key having a decoding permission level for each binding data;
 a step for confirming the binding data to be accessed according to a decoding permission level for the binding data;
 a step for extracting at least a portion of a binding key for the identified binding data; and
 a step for decoding the binding data by using at least a portion of the extracted binding key;
 wherein the data block comprises:
 a header region including index information indicating the type of the at least one binding data;
 a public region into which a hash value of the at least one binding data stored in the data block is stored;
 a binding region in which each encoded binding data and at least a portion of its corresponding binding key are stored; and
 a private region in which encoded private data is stored;
 wherein the decoding permission of the plurality of the encoded blinded data in the data block is multiplexed, such that when a node decodes a stored data block, a portion of the data block associated with the permission level is decoded instead of decoding the entire data block.

17. The method for processing a data block of the claim 16, wherein a step for decoding the binding data by using at least a portion of the extracted binding key comprises, a step for searching the entire contents of the binding key from at least a portion of the extracted binding key; and a step for decoding the binding data by using the searched binding key.

18. The method for processing a data block of the claim 16, further comprising a step for generating a derived data block by reducing the data block, wherein the step for generating the derived data block comprises, a step for storing the binding data selected from the at least one binding data stored in the binding region of the data block, and a binding key corresponding to the selected data into the derived binding data region; a step for storing a modification index information indicating the type of the selected binding data into a derived header region; and a step for storing a modified hash value of the selected binding data into a derived public region.

19. The method for processing a data block of the claim 16, further comprising a step for decoding at least one binding data among the binding data stored in the binding region of the data block, and verifying the decoded data.

* * * * *